United States Patent [19]

Ishii et al.

[11] 4,132,123
[45] Jan. 2, 1979

[54] REMOTE-CONTROL GEARSHIFT MECHANISM FOR VEHICULAR TRANSMISSION

[75] Inventors: Hakumi Ishii; Yoshitaka Sogo; Shuichiro Ida, all of Toyota, Japan

[73] Assignee: Toyota Jidosha Kogyo Kabushiki Kaisha, Toyota, Japan

[21] Appl. No.: 809,042

[22] Filed: Jun. 22, 1977

[30] Foreign Application Priority Data

Jan. 22, 1977 [JP] Japan ................................. 52/6234

[51] Int. Cl.² ............................................. G05G 9/16
[52] U.S. Cl. .............................. 74/473 SW; 74/486
[58] Field of Search ............... 74/473 SW, 484, 485, 74/486; 92/131

[56] References Cited

U.S. PATENT DOCUMENTS

| 2,230,847 | 2/1941 | Pickett | 74/473 SW X |
| 3,121,344 | 2/1964 | Fodrea | 74/486 X |
| 3,646,828 | 3/1972 | Milton et al. | 74/473 SW X |

FOREIGN PATENT DOCUMENTS

| 984460 | 2/1951 | France | 74/485 |
| 460551 | 1/1937 | United Kingdom | 92/131 |

*Primary Examiner*—Allan D. Herrmann
*Attorney, Agent, or Firm*—Cushman, Darby & Cushman

[57] ABSTRACT

In a remote-control gearshift mechanism for a vehicle of the type including a control shaft extended in parallel with a steering column and movable in the axial direction and rotatable about its axis by a gearshift lever, a linkage for transmitting the axial and rotary movements of said control shaft to a transmission, a first spring loaded over the lower portion of said control shaft for normally biasing said control shaft upward to its neutral position which corresponds to a position intermediate between the ends of the stroke of said control shaft in the axial direction, a second spring loaded over the upper portion of said control shaft for normally biasing said control shaft downward to its neutral position, and stopper means for limiting the spring action of said each spring independently of each other in such a manner that said control shaft may be prevented from moving past its neutral position, whereby shift-lever-action feeling may be improved.

3 Claims, 6 Drawing Figures

REMOTE-CONTROL GEARSHIFT MECHANISM FOR VEHICULAR TRANSMISSION

BACKGROUND OF THE INVENTION

The present invention relates to generally a remote-control gearshift mechanism for a vehicular transmission and more particularly a steering column type remote-control gearshift mechanism for a four-or five-speeds automotive transmission.

As is well known, in the conventional remote-control gearshift mechanism of the type described, a driver shifts a gearshift level to cause the axial movement and rotation of a control shaft extended in parallel with a steering column, and the axial and rotary movements of the control shaft are transmitted through a linkage to a transmission so that a desired gearshift may be made. In a four- or five-speeds transmission, in general, the control shaft is so arranged as to shift between three positions in the axial direction and is so biased by springs at both ends of the control shaft in opposite directions that the control shaft may be automatically returned to the intermediate or neutral position. However, only one of the two springs is provided with means for limiting the expansion range of this spring in such a way that the force of the spring may not be further exerted to the control shaft once the latter has been returned to its neutral position. Whereas the expansion range of the other bias spring is restricted by the force of one spring so that the control shaft may be prevented from moving past its neutral position. Accordingly the force of one spring must be stronger than that of the other spring and as a result the gear shifting forces required for causing the control shaft to shift upward or downward from its neutral position are different in magnitude and consequently a driver feels unbalanced gearshift actions. In order to ensure light gearshift-action feeling, the weaker the springs, the better, but the force of one spring cannot be reduced beyond a certain magnitude because the force of the other spring must be so excessively reduced due to the reason described above that it cannot bring the control shaft back to its neutral position.

SUMMARY OF THE INVENTION

In view of the above, one of the objects of the present invention is to provide a steering column type remote-control gearshift mechanism for a four-or five-speeds automotive transmission which may substantially eliminate the defects encountered in the conventional remote-control gearshift mechanisms and which may give a driver optimum gearshift action feeling.

According to the present invention, means is provided for limiting the expansion ranges of not only one spring but also the other spring independently of each other so that a control shaft may be automatically returned to its neutral position in a positive and reliable manner independently of the force of each spring. As a result, it is not necessary in design to take the forces of selected springs into consideration so that the springs may be used freely and the springs which can attain most optimum results may be selected. In addition, the force of one spring may be reduced as compared with the conventional springs so that gearshift-action feeling may be remarkably improved.

BRIEF DESCRIPTION OF THE DRAWINGS

Same reference numerals are used to designate similar parts throughout the figures.

DESCRIPTION OF THE PREFERRED EMBODIMENTS

Prior to the description of the preferred embodiments of the present invention, the prior art steering column remote-control gearshift mechanism will be described briefly with reference to FIGS. 1, 2 and 3 in order to specifically point out the problems thereof.

Figure 1:
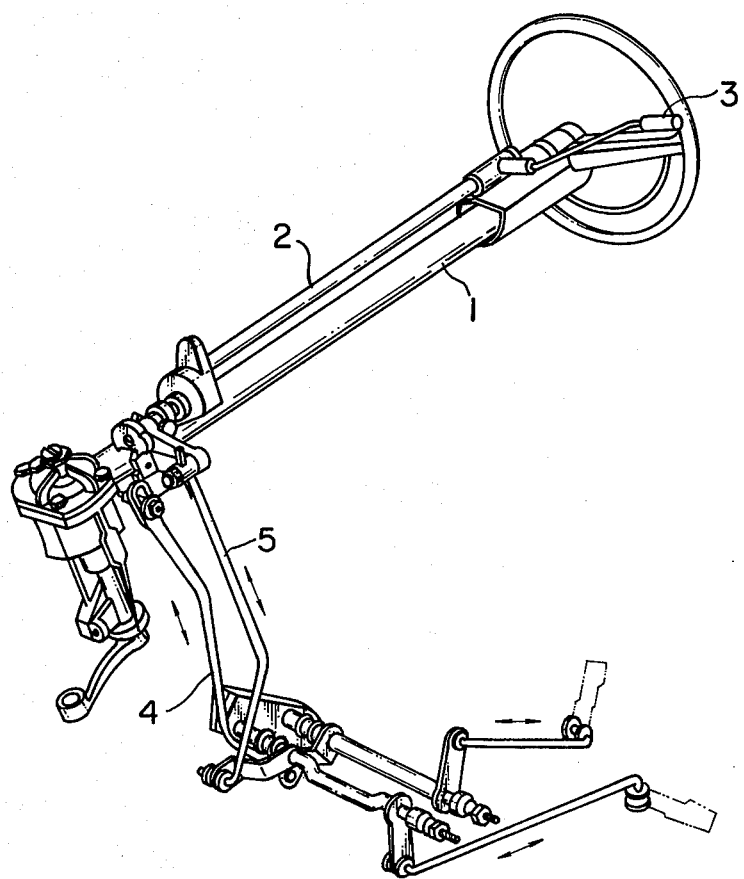
FIG. 1 is a perspective view of a conventional steering column type remote-control gearshift mechanism.

First referring to FIG. 1, as is well known in the art, a driver makes gearshifts by moving a shift lever 3 at the upper end of a control shaft 2 extended in parallel with a steering column 1. That is, when the control shaft 2 is removed up or down in the axial direction thereof, a selector rod 4 is moved in either direction indicated by a double-pointed arrow so that two associated sets of gears desired to be meshed in a transmission are selected. Thereafter when the control shaft 2 is rotated about its axis in either direction, a shift rod 5 is caused to move in either direction indicated by a double-pointed arrow so that the gear mesh in either of the two selected sets may be completed. In four or five-speeds transmissions, when the control shaft 2 is in the neutral position the second or third speed is selected; when the control shaft is shifted upward, the first speed or reverse is selected; and when the control shaft 2 is shifted downward, the fourth or fifth speed is selected. The control shaft 2 is automatically returned to its neutral position from the up or down position under the forces of springs as will be described in detail below with reference to FIGS. 2 and 3.

Figure 2:
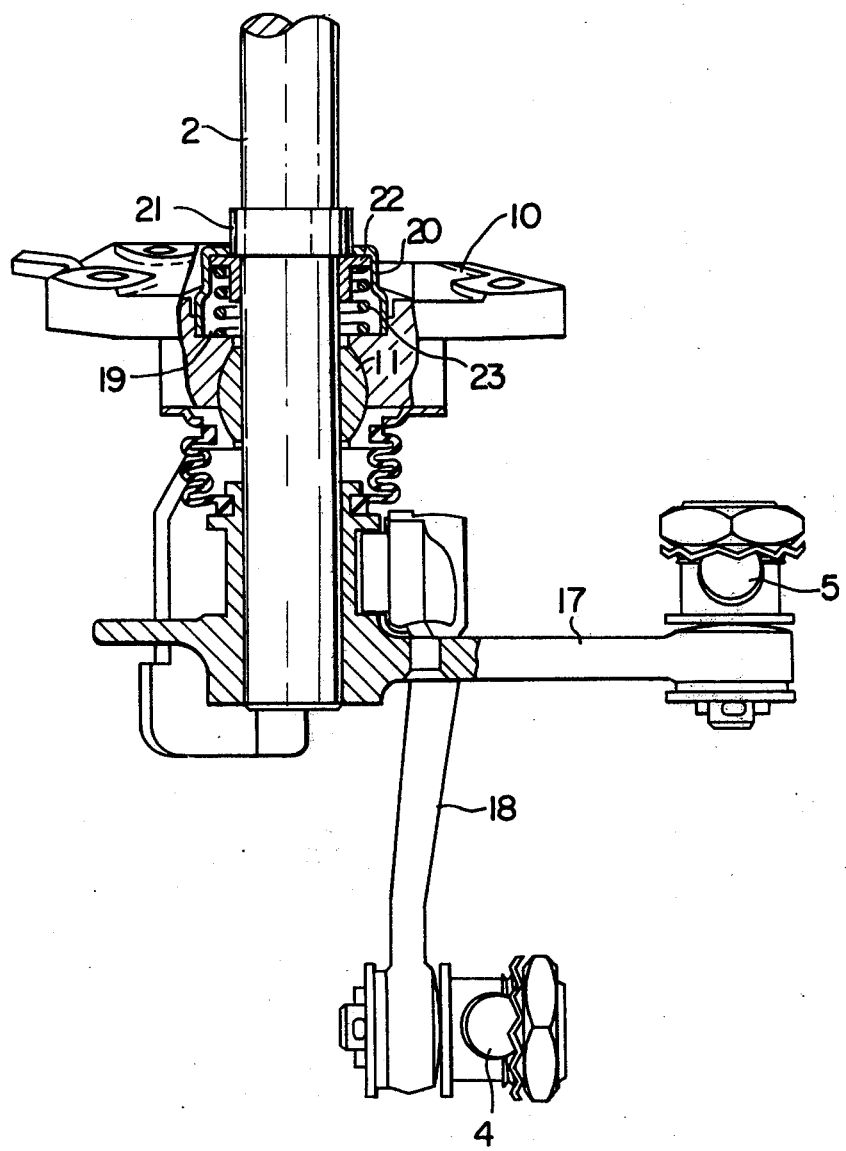
FIGS. 2 and 3 are sectional views, on enlarged scale of the lower and upper sections, respectively, of a control shaft of the steering mechanism shown in FIG. 1.
Figure 3:
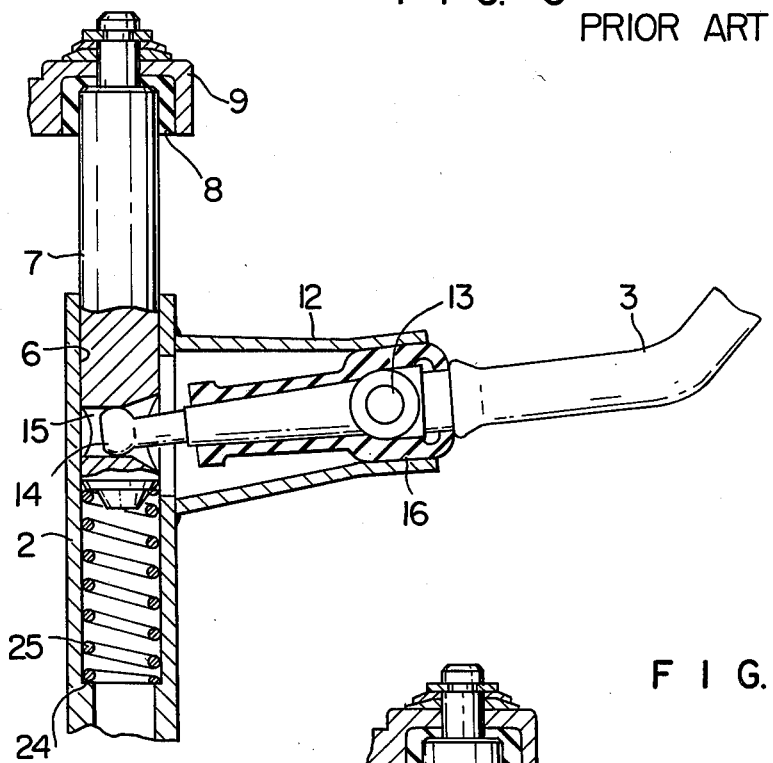

Next referring to FIGS. 2 and 3 illustrating in detail the lower and upper sections, respectively, of the control shaft 2, its mechanism for automatically returning the control shaft 2 to its neutral position will be described. As shown in FIG. 3, a stationary rod 7 is inserted into a bore 6 formed at the upper section of the control shaft 2 and has its upper end fitted with a rubber bushing 8 and securely fixed to an upper bracket 9 which in turn is securely attached to the steering column 1 (See FIG. 1). The lower end portion of the control shaft 2 is supported by a spherical bushing 11 which in turn is mounted on a lower bracket 10 securely anchored to a vehicle body (not shown).

A sleeve 12 is extended laterally from the upper portion of the control shaft 2, and one end portion of the shift lever 3 is fitted with a vibration isolation bushing 16 and is inserted into the sleeve 12 and pivoted with a pivot pin 13 to the sleeve 12 for up and down pivotal movement. One end of the shift lever 3 is terminated into a ball 14 which is fitted into a hole 15 of the stationary rod 7 so that upon up and down pivotal movement of the shift lever 3, the control shaft 2 which is guided by the stationary rod 7 and the spherical bushing 11 is caused to move up and down along its axis and when the shift lever 3 is turned to the right or left, the control shaft 2 is caused to rotate about its axis in either direction.

Attached to the lower end of the control shaft are a first lever 17 which rotates in unison with the control shaft 2 and a second lever 18 which has a L-shape and is pivoted at a position intermediate at its ends and which is caused to move vertically with respect to the plane of FIG. 2 when the control shaft 2 is shifted up and down. The first lever 17 transmits the rotation of the control shaft 2 to the shift rod 5 whereas the second lever 18 transmits the up and down movement of the control shaft to the selector rod 4.

The lower bracket 10 is provided above the spherical bushing 11 with a recess 19 coaxially surrounding the control shaft 2 with an annular space from the latter and a holder 20 having a flange radially inwardly extended from the upper end is press-fitted into the recess 19. The control shaft 2 has a flange 21 formed integral therewith, and a spacer ring 22 is slidably fitted over the control shaft 2 below the flange 21. A spring 23 is loaded between the spacer ring 22 and the bottom of the recess 19 so that the spacer ring 22 is normally biased upward to abut against the flange 21, but the further upper movement of the spacer ring 21 is limited by the holder 20. That is, when the spacer ring 22 is made into engagement with the holder 20, the control shaft 2 is held in its neutral position.

Referring to FIG. 3, the lower portion of the bore 6 of the control shaft 2 is reduced in diameter so that a step 24 may be formed, and a second spring 25 is loaded between this step 24 and the lower end of the stationary rod 7 so that the control shaft 2 may be normally biased downward.

Next the mode of operation will be described. When a driver shifts the shift lever 3 downward, the control shaft 2 is caused to move downward against the lower spring 23 so that the fourth or fifth speed is selected, and the control shaft 2 is automatically returned to its neutral position under the force of the lower spring 23. On the other hand, when the driver shifts the shift lever 3 upward, the control shaft 2 is caused to move upward against the upper spring 25, sliding through the spacer ring 22 which is held in engagement with the holder 20 so that the first speed or reverse is selected, and the control shaft 2 is automatically returned to its neutral position under the force of the upper spring 25.

When the control shaft 2 is returned upwardly to its neutral position under the force of the lower spring 23, the upward movement is limited by the engagement of the spacer ring 22 with the holder 20, but in order to limit the downward movement of the control shaft 2 under the force of the upper spring 25 to its neutral position, the lower spring 23 must be stronger than the upper spring 25 so that the control shaft 2 may not pass beyond the neutral position after having its flange 21 engaged with the spacer ring 22. As a result, the forces required for moving the control shaft 2 upward and downward are different in magnitude so that the driver feels unbalanced gearshift actions.

One of the solutions to this problem may be such an arrangement that the spring may be expanded to its free length when the control shaft 2 reaches its neutral position, but this approach is not successful because of the production variety of springs. In addition, in order to give the driver pleasant and light gearshifting action feeling, the weaker the spring force, the better. Therefore if the force of the lower spring 23 is reduced to a minimum, the force of the upper spring 25 becomes too weak to return the control shaft 2 to its neutral position so that the driver must seek for the neutral position and manually set the control shaft 2 to it when the second or third speed is selected. Furthermore there inevitably exists a play or gap between the links connecting the control shaft and the transmission so that sometimes the control shaft does not return to its neutral position. To avoid this problem, the upper spring 25 must be stronger than a minimum, and when the lower spring 23 is selected based upon the upper spring 25, it inevitably becomes considerably stronger. The above described problems also exist in the remote-control gearshift mechanisms of the type utilizing the internal spring of the transmission without the use of the lower spring 23.

The present invention was made to solve the above and other problems encountered in the prior art remote-control gearshift mechanism, and provides a novel construction for supporting the upper spring in such a manner that the springing forces of the lower and upper springs may be adjusted independently of each other. As a result, the springing forces may be same in magnitude or they may be differentiated so that a driver may feel optimum gearshift actions.

Figure 4:
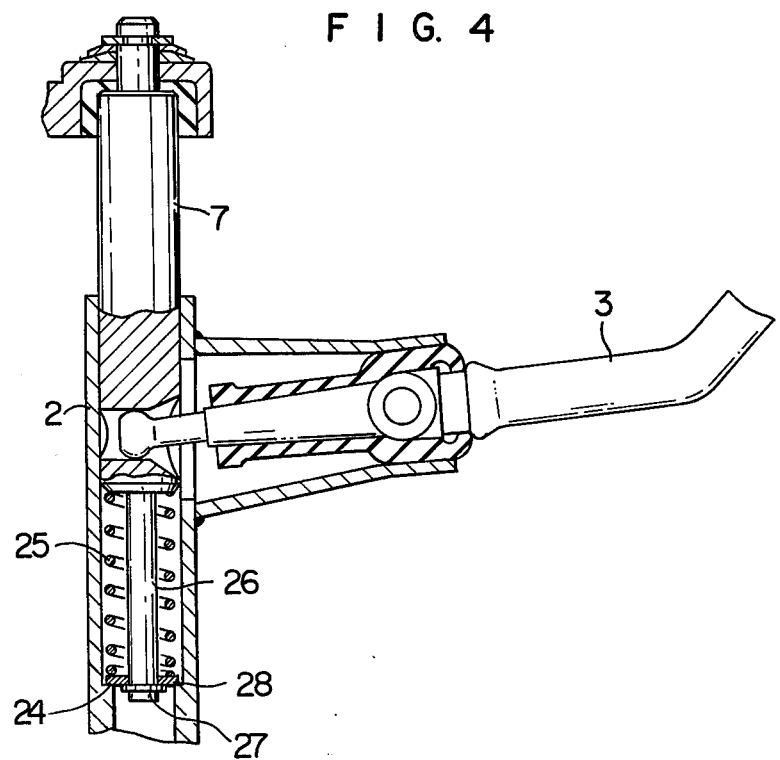
FIG. 4 is an enlarged view of the upper section of a control shaft of a first embodiment of a remote-control gearshift mechanism in accordance the present invention.

Referring to FIG. 4, the first embodiment of the present invention will be described. A small-diameter rod 26 is extended downward from the lower end of the stationary rod 7 into the control shaft 2, and a stopper ring 27 is securely attached to the lower end of the small-diameter rod 26. A spring retaining ring 28 is slidably fitted over the small-diameter rod 26 between the lower end of the stationary rod 7 and the stopper ring 27, and the second or upper spring 25 is loaded between the spring retaining ring 28 and the lower end of the stationary rod 7. The position of the stopper ring 27 is so selected that when the control shaft 2 is in its neutral position, the spring retaining ring 28 is in engagement with the step 24.

When the driver shifts the shift lever 3 to cause the control shaft 2 to move upward, the step 24 pushes the retaining ring 28 upward so that the upper spring 25 is compressed, and upon returning to the neutral position the upper spring 25 expands to cause the control shaft to move downward through the spring retaining ring 28 and the step 24. Since the expansion of the upper spring 25 is limited when the retaining ring 28 engages with the stopper ring 27, the further downward movement of the control shaft 2 is positively limited so that the control shaft 2 may be automatically returned to its natural position in a very reliable manner.

The first or lower spring 23 is loaded in a manner substantially similar to that described with reference to FIG. 2, and the upward movement to the neutral position of the control shaft 2 is limited by the engagement of the spacer ring 22 with the holder 20.

Thus according to the first embodiment of the present invention, the springing forces of both the lower and upper springs 23 and 25 are limited at the neutral position of the control shaft 2 so that optimum springing forces may be selected freely.

Figure 5:
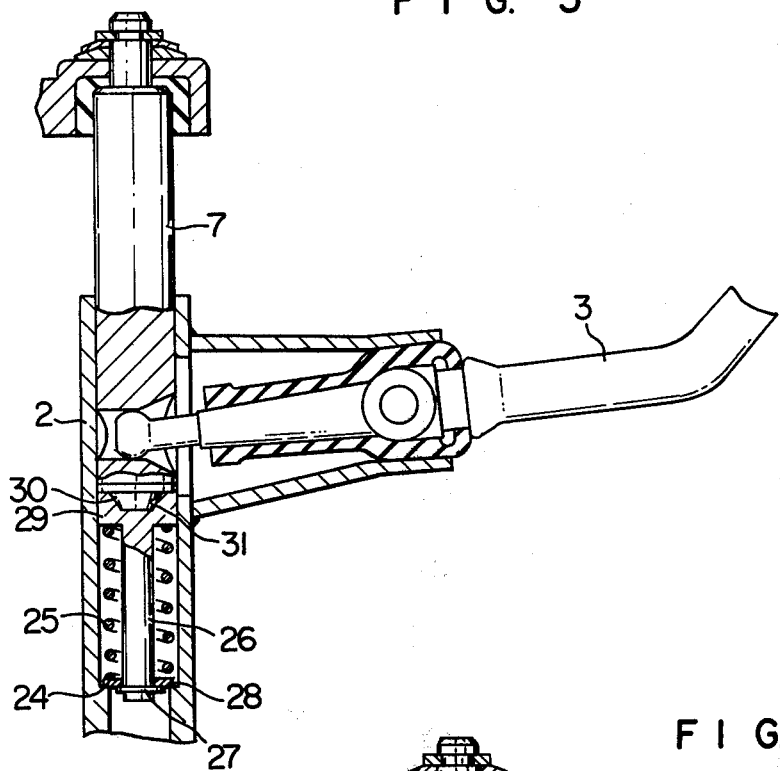
FIG. 5 is an enlarged view of the upper section of a control shaft of a second embodiment of the present invention.

Next referring to FIG. 5 the second embodiment of the present invention will be described. Instead of the small-diameter rod 26 integral with the stationary rod 7, an independent rod 26 is used so that the present invention may be equally applied to the prior art remote-control gearshift mechanisms with the stationary rod 7 in the prior art construction as shown in FIG. 3. The upper end of the small-diameter rod 26 is terminated into a head 29, and the second or upper spring 25 is loaded between the spring retaining ring 28 and the undersurface of the head 29. A frustoconical projection 30 is extended from the lower end of the stationary rod 7, and formed at the upper surface of the head 29 is a recess 31 mating with the projection 30.

In assembly, first the second or upper spring 25 is fitted over the small-diameter rod 26 and inserted into the control shaft 2, and then the stationary rod 7 is fitted into the control shaft 2.

As in the first embodiment, the expansion of the second or upper spring 25 is limited by the engagement of the spring retaining ring 28 with the stopper ring 27 so that the control shaft 2 may be automatically, positively and reliably returned to the neutral position.

Figure 6:
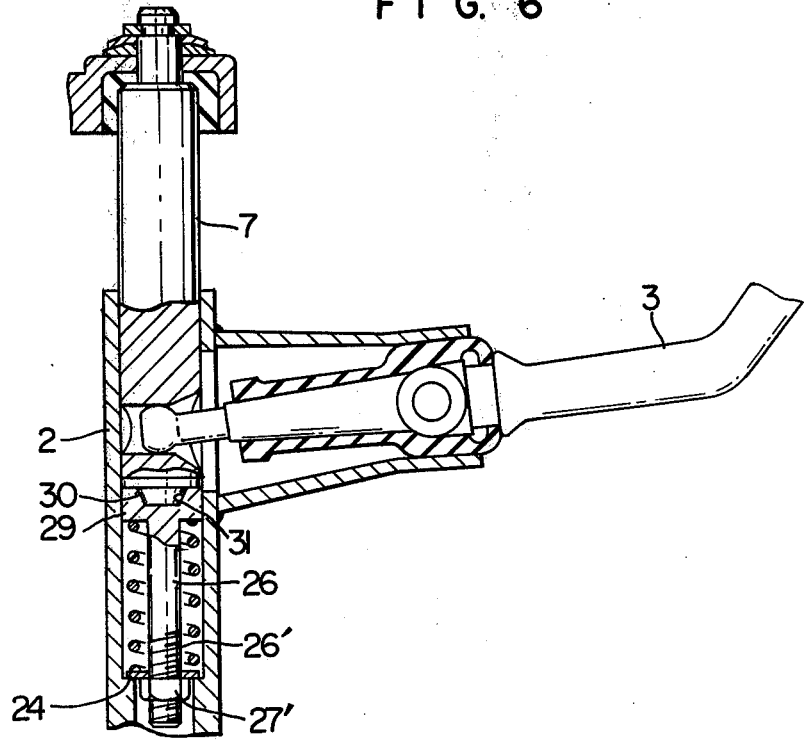
FIG. 6 is an enlarged view of a modification of the second embodiment.

FIG. 6 shows a modification of the second embodiment wherein the lower end portion of the small-diameter rod 26 is externally threaded as indicated at 26' and instead of the stopper ring 27, a nut 27' is screwed onto the small-diameter rod 26. This arrangement is advantageous in that the position of the stopper nut 27' may be suitably adjusted and consequently an dimensional error caused during assembly may be effectively corrected.

In summary, according to the present invention the prior art remote-control gearshift mechanisms may be modified in a simple manner so that the springing force of the second or upper spring and hence the springing force of the first or lower spring may be freely selected and consequently the control shaft 2 may be automatically returned to its neutral position in a very positive and reliable manner. In addition, the driver may feel optimum gearshift actions.

What is claimed is:

1. In a remote-control gearshift mechanism for a vehicle of the type including
    a control shaft extended in parallel with a steering column and movable in the axial direction and rotatable about its axis by a gearshift lever,
    a linkage for transmitting the axial movement and rotation of said control shaft to a transmission,
    a first spring loaded over the lower portion of said control shaft for normally biasing said control shaft upward to its neutral position which corresponds to a position intermediate between the ends of the stroke of said control shaft in the axial direction,
    a second spring loaded over the upper portion of said control shaft for normally biasing said control shaft downward to its neutral position,
    stopper means for limiting the spring action of said first spring in such a manner that said control shaft may be prevented from moving past its neutral position,
    an improvement comprising
    a bore coaxially extended through the upper portion of said control shaft from the upper end thereof and downward a predetermined distance,
    a stationary rod which has its upper end securely attached to the steering column and is telescopically inserted into said bore of said control shaft,
    a small-diameter rod extended downward from the lower end of said stationary rod coaxially thereof,
    a spring retaining ring axially slidably fitted over said small-diameter rod,
    a stopper ring attached to the lower end of said small-diameter rod for engagement with said spring retaining ring to limit the downward movement of said spring retaining ring,
    a step at the bottom of said bore for engagement with the undersurface of said spring retaining ring, and
    said second spring fitted over said small-diameter rod and loaded between the lower end of said stationary rod and said spring retaining ring.

2. An improvement as set forth in claim 1 wherein the upper end of said small-diameter rod is terminated into a head which may be releasably engageable with the lower end of said stationary rod, and
    said second spring is loaded between said head and said spring retaining ring.

3. An improvement as set forth in claim 2 wherein said stopper ring consists of a nut screwed onto the lower end of said small-diameter rod.

* * * * *